W. J. PANNIER, Jr.
STAMPING MACHINE.
APPLICATION FILED APR. 22, 1912.

1,049,908.

Patented Jan. 7, 1913.

2 SHEETS—SHEET 1.

WITNESSES

INVENTOR
William J. Pannier
BY,
ATTORNEY

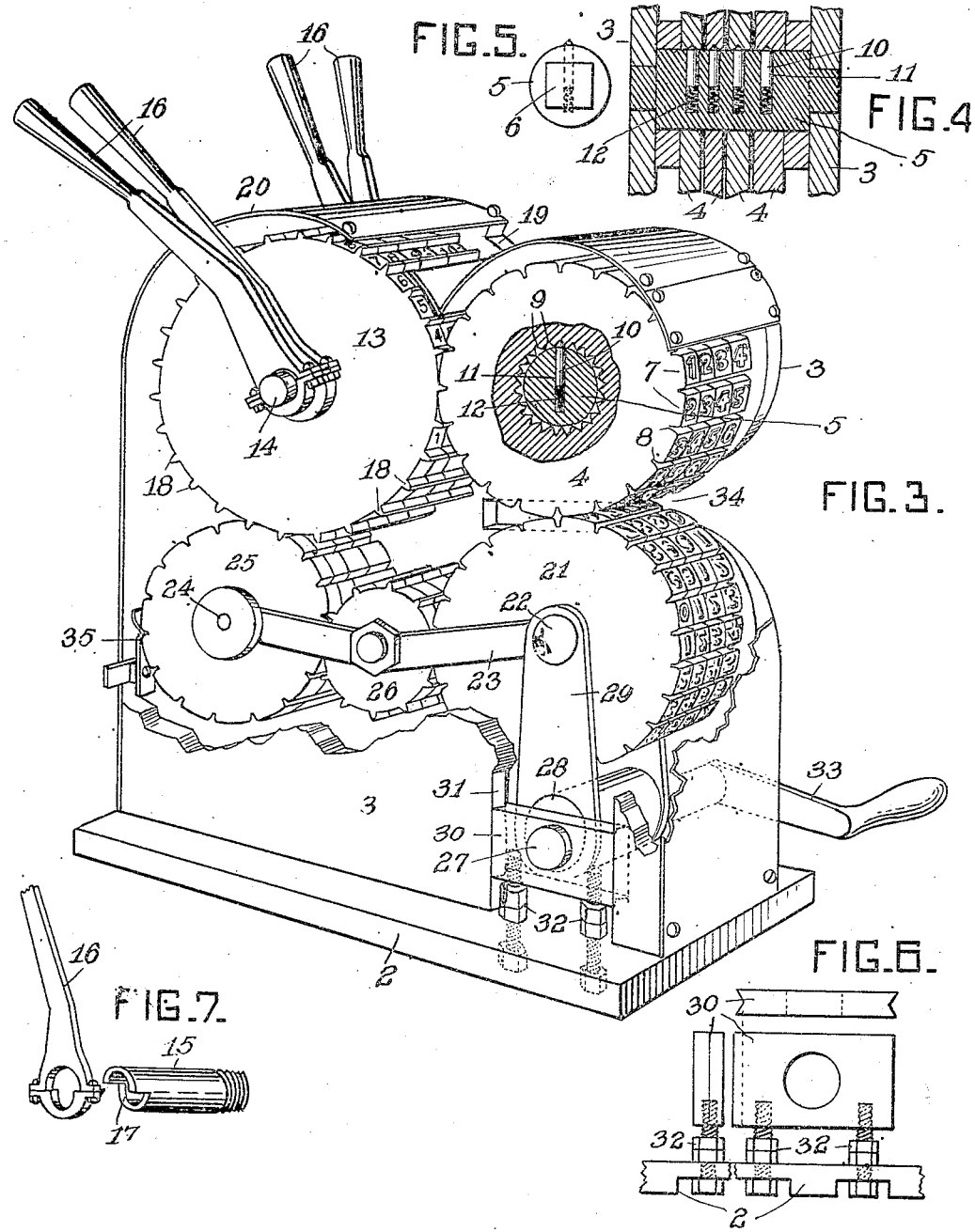

UNITED STATES PATENT OFFICE.

WILLIAM J. PANNIER, JR., OF PITTSBURGH, PENNSYLVANIA, ASSIGNOR TO PANNIER BROTHERS STAMP COMPANY, OF PITTSBURGH, PENNSYLVANIA, A CORPORATION OF PENNSYLVANIA.

STAMPING-MACHINE.

1,049,908.

Specification of Letters Patent. Patented Jan. 7, 1913.

Application filed April 22, 1912. Serial No. 692,458.

*To all whom it may concern:*

Be it known that I, WILLIAM J. PANNIER, Jr., a citizen of the United States, residing at Pittsburgh, in the county of Allegheny and State of Pennsylvania, have invented certain new and useful Improvements in Stamping-Machines, of which the following is a specification.

My invention consists of an improvement in stamping machines for embossing sheet metal.

It has for its object to provide a machine of this class having a plurality of pairs of type wheels, so arranged as to be simultaneously adjustable as to one of each pair, capable of being set to any desired combination of characters, and capable of being set in conformity with the reading on a set of visible master wheels.

The apparatus comprises an upper and lower set of stamping wheels, one set being vertically adjustable by suitable mechanism into operative position with relation to the other set, also a set of master wheels geared with each of said sets of stamping wheels. Also separate lever mechanism whereby each wheel and the train of wheels geared with it may be actuated individually, with mechanism for adjusting the normal height of the adjustable wheels, means for automatically arresting each wheel at its proper position, and other features of improvement as shall be more fully hereinafter set forth.

Figure 1:
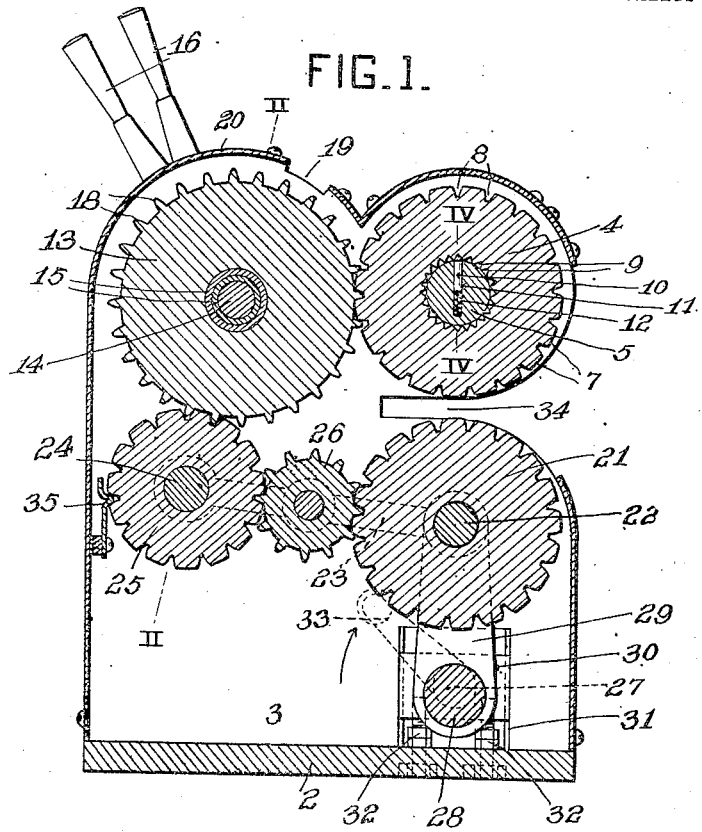
Figure 2:
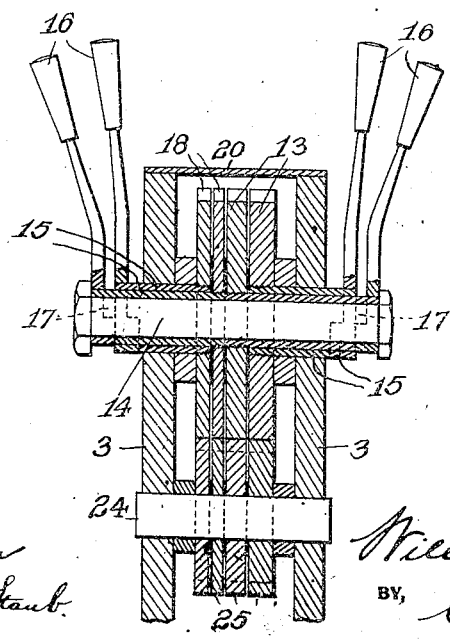

In the drawings: Figure 1 is a longitudinal vertical sectional view of the machine, in normal position. Fig. 2 is a cross section on the line II. II. of Fig. 1. Fig. 3 is a perspective view of the machine, partly broken away, showing the lower wheels raised. Fig. 4 is a sectional detail view indicated by the line IV. IV. of Fig. 1. Fig. 5 is an end view of the supporting shaft for the upper stamping wheels. Fig. 6 is a collective detail view of one of the vertically adjustable bearings for the raising shaft for the lower wheels. Fig. 7 is a similar view of one of the rotatable stems and its crank for one of the master wheels.

The machine as a whole is mounted on a suitable base 2 having substantial supporting sides 3, 3, extending upwardly therefrom and providing bearings for the upper stamping wheels, the master wheels, and the first set of idler gears for transmitting motion to the lower, vertically adjustable stamping wheels.

The upper stamping wheels 4 are rotatably mounted around a shaft or stud 5, of barrel form, the ends 6 of which are squared or otherwise formed and fitted non-rotatably in receiving sockets in the sides 3. In the machine as illustrated four vertically stationary stamping wheels are shown, although any desired number may be used, and these wheels are rotatably mounted side by side on the shaft 5, thin intervening washers being preferably inserted between each pair of adjacent wheels. Each wheel 4 is provided around its periphery with series of characters, as figures, either a part only or the whole of the circumference being utilized, as desired. The characters, whether constituting the male or female members of the complete die mechanism including the lower vertically movable wheels, are each on the face of the individual projecting facets 7 and between the facets, transversely of the wheel, are grooves 8, in annular series, which grooves constitute gear members for the co-acting master wheels. Each wheel 4 is provided, in its hub portion with a centrally arranged annular series of coniform sockets 9, corresponding in number and arrangement to the number and arrangement of the facets 7. A locking pin 10 having a coniform terminal is seated in a socket 11 in the shaft upon a cushion spring 12, one such pin being provided for each wheel. As each wheel is rotated to the desired position, the pin automatically slips over the sockets until the proper position is reached, whereupon the pin will be inserted in the corresponding socket and will hold the wheel with sufficient power to prevent accidental displacement or variation.

A series of master wheels 13 are rotatably mounted around a supporting shaft 14 extending transversely of the sides 3, 3, around which are journaled the individual tubular wheel stems 15, in telescopic arrangement. Each of such stems 15 is connected at its inner end with one of the master wheels 13 by a screw threaded connection, as shown, and each stem is also provided with an individual operating lever 16, deflected outwardly for clearance, as shown. The levers may be of any construction and manner of attachment, but for security and positive connection, I have made them as shown in Fig. 7 with one half of the end of the stem 15 off-set or stepped as indicated at 17 by which the embracing end of the crank will fixedly hold and engage the sleeve for positive rotation. Each master wheel is provided with an annular series of teeth 18 adapted to engage the recesses or grooves 8 of the character wheels 4, for rotation. Also, between the teeth 18 are isolated recessed spaces, bearing indicating characters corresponding in arrangement and number to those of the individual stamping wheels 4. By this means, when the particular character desired is brought on the master wheel in register with a reading or observation slot 19 in a covering casing 20 of sheet metal, the operator knows that the proper stamping character on wheel 4 is in position, vertically below the center, for coöperation with the companion adjustable wheel 21. It will be understood that each of the master wheels may be thus located by its particular lever bringing the desired character into registering position, until the proper combination of characters is set. The co-acting character wheels 21 are rotatably mounted on a vertically movable carrying shaft 22 carried by swinging links 23, 23, pivotally mounted on shaft 24 of idler gears 25 and carrying also the journaled idler gears 26, which mesh into gears 25 and into character wheels 21 respectively. As shown, the tooth arrangement of said wheels corresponds to that of wheels 4 and 13 above described. Idler gears 25 meshing into gears 13 thus serve to transmit motion to the wheels 21 in proper direction and rate of speed exactly corresponding to the movement of wheels 4, so that the pairs of impressing wheels thus are always in consonance. Vertical movement is imparted to the lower series of stamping wheels 21 by means of an operating shaft 27 having eccentric or cam enlargements 28 engaging the lower portions of lifting links or pitmen 29, at each side, and supporting the shaft 22, as shown. Shaft 27 is mounted at each side of frame 3 in vertically adjustable boxes or housings 30 carried in V-shaped slides or ways 31 and capable of being accurately set by supporting temper screws 32 and locking nuts to any desired height. By this means I am enabled to accurately adjust the mounting of the lower stamping wheels so that at the limit of their upward travel, they will have just sufficient movement to effect a proper impression in the metal blank. Shaft 27 is provided at one side with an operating crank 33 by which the desired throw of the eccentric adjustment may be had, and the crank is so arranged as to give the operator the maximum leverage in operation.

As shown, the sheet metal cover 20 almost entirely surrounds the operative portions of the machine. The side portions 3 are provided at each side with converging openings 34 providing ample clearance for the blank, the cover 20 being also spaced apart at the front of the machine for the same purpose.

In order to further effectually check momentum of the several wheels, in addition to the action of the spring pins 11, I provide additional arresting spring catches 35 adapted to engage the annular tooth recesses of idler wheels 25, and to spring over the intervening projecting teeth in the operation of the machine.

The operation will be readily understood from the foregoing description. The several stamping wheels 21 and 4 having been set to the desired combination of figures or characters by the individual levers 16, the sheet metal blank is inserted between the die faces of the stamping wheels, in clearance space 34, the crank 33 is actuated, throwing the lower set of wheels 21 upwardly with the necessary force, and on reversal of the crank, the wheels are lowered and the stamped article removed.

If desired, the movement of the shaft 27 may be made continuous by merely using an ordinary driving pulley in place of the crank.

The advantages of the invention reside in its compact strong construction, the facility for easily and quickly setting the stamping wheels to any desired combination without danger of error, positive action is insured, and the machine as a whole has been found to do the work for which it is intended in a highly satisfactory manner and within a maximum output.

What I claim is:

1. In a stamping machine, the combination of oppositely arranged co-acting stamping wheels having annular series of characters, means for rotating said wheels together, indicating mechanism in gear with the stamping wheels, and means for moving one of said wheels toward and from the other.

2. In a stamping machine, the combination of oppositely arranged co-acting stamping wheels having annular series of characters, means for rotating said wheels together, means in gear therewith for indicating the desired position of the stamping wheels, and means for moving one of said wheels toward and from the other.

3. In a stamping machine, the combination of series of pairs of oppositely arranged co-acting stamping wheels having annular series of characters, means for rotating the individual wheels of an oppositely located pair together, and means for moving all of the wheels together at one side toward and from the wheels of the other side.

4. In a stamping machine, the combination of individually operative master wheels, a series of rotatably mounted stamping wheels geared therewith, a corresponding series of rotatably mounted stamping wheels arranged for adjustment toward and from said stamping wheels, and gearing connecting said adjustable stamping wheels with the master wheels.

5. In a stamping machine, the combination of individually operative master wheels, a series of rotatably mounted stamping wheels geared therewith, a corresponding series of rotatably mounted stamping wheels arranged for adjustment toward and from said stamping wheels, gearing connecting said adjustable stamping wheels with the master wheels, and means for arresting the master wheels intermittently.

6. In a stamping machine, the combination of a series of individual master wheels having gear peripheries, a supporting shaft therefor, a plurality of telescopically arranged tubular stems connected with individual wheels and each having an operating handle, and two series of stamping wheels geared with said master wheels, one of said series being movable toward and from the other series.

7. In a stamping machine, the combination of a series of individual master wheels having gear peripheries, a supporting shaft therefor, a plurality of telescopically arranged tubular stems connected with individual wheels and each having an operating handle, and two series of stamping wheels geared with said master wheels, one of said series having mechanism for adjusting them toward and from the other series.

8. In a machine of the class described, the combination with the upper series of stamping wheels, of a lower series of stamping wheels, a shaft therefor, an operating shaft having eccentric mechanism, and means connecting said mechanism with said shaft, substantially as set forth.

9. In a machine of the class described, the combination with the upper series of stamping wheels, of a lower series of stamping wheels, a shaft therefor, an operating shaft having eccentric mechanism, and means connecting said mechanism with said shaft, and adjustable bearings for the operating shaft, substantially as set forth.

10. The combination with a series of stamping wheels having annular series of locking cavities, of a supporting shaft for the wheels provided with a plurality of spring-pressed pins adapted to engage said locking cavities, substantially as set forth.

In testimony whereof I hereunto affix my signature in the presence of two witnesses.

WILLIAM J. PANNIER, Jr.

Witnesses:
C. M. CLARKE,
FREDK. STAUP